United States Patent [19]
Yu

[11] Patent Number: 5,765,414
[45] Date of Patent: Jun. 16, 1998

[54] STEERING WHEEL LOCK

[76] Inventor: Chien-Ho Yu, No. 253-59, Kang-Kou, Kang-Kou Tsun, An-Ting Hsiang, Tainan Hsien, Taiwan

[21] Appl. No.: 854,099

[22] Filed: May 9, 1997

[51] Int. Cl.$^6$ .................................................. B60R 25/02
[52] U.S. Cl. ........................... 70/209; 70/226; 70/DIG. 49
[58] Field of Search ........................... 70/209, 211, 212, 70/247, DIG. 49, 226, 237–239; 340/425.5, 426; 307/10.2

[56] References Cited

U.S. PATENT DOCUMENTS

| | | | |
|---|---|---|---|
| 5,372,019 | 12/1994 | Hsiao | 70/238 X |
| 5,491,991 | 2/1996 | Guillory | 70/238 X |
| 5,540,067 | 7/1996 | Kim | 70/DIG. 49 X |
| 5,587,702 | 12/1996 | Chadfield | 70/DIG. 49 X |
| 5,598,725 | 2/1997 | Chang | 70/DIG. 49 X |
| 5,609,050 | 3/1997 | Yu | 70/DIG. 49 X |
| 5,635,899 | 6/1997 | Carlo et al. | 70/238 X |
| 5,636,537 | 6/1997 | Chen | 70/DIG. 49 X |
| 5,671,619 | 9/1997 | Hou | 70/209 |
| 5,676,000 | 10/1997 | Chen | 70/209 |
| 5,678,434 | 10/1997 | Kuo et al. | 70/226 X |

*Primary Examiner*—Lloyd A. Gall
*Attorney, Agent, or Firm*—Varndell Legal Group

[57] ABSTRACT

A steering wheel lock including a lock body having a bottom open chamber adapted to receive one three-way frame section of a steering wheel of a motor vehicle, a shackle inserted into shackle holes in the lock body and locked by a lock cylinder to firmly secure the lock body to the three-way frame section of the steering wheel, and an alarm system installed in the lock body which is disarmed when the shackle is locked, or triggered to produce an audio alarm signal through a speaker when the shackle is forced out of the locking position.

1 Claim, 5 Drawing Sheets

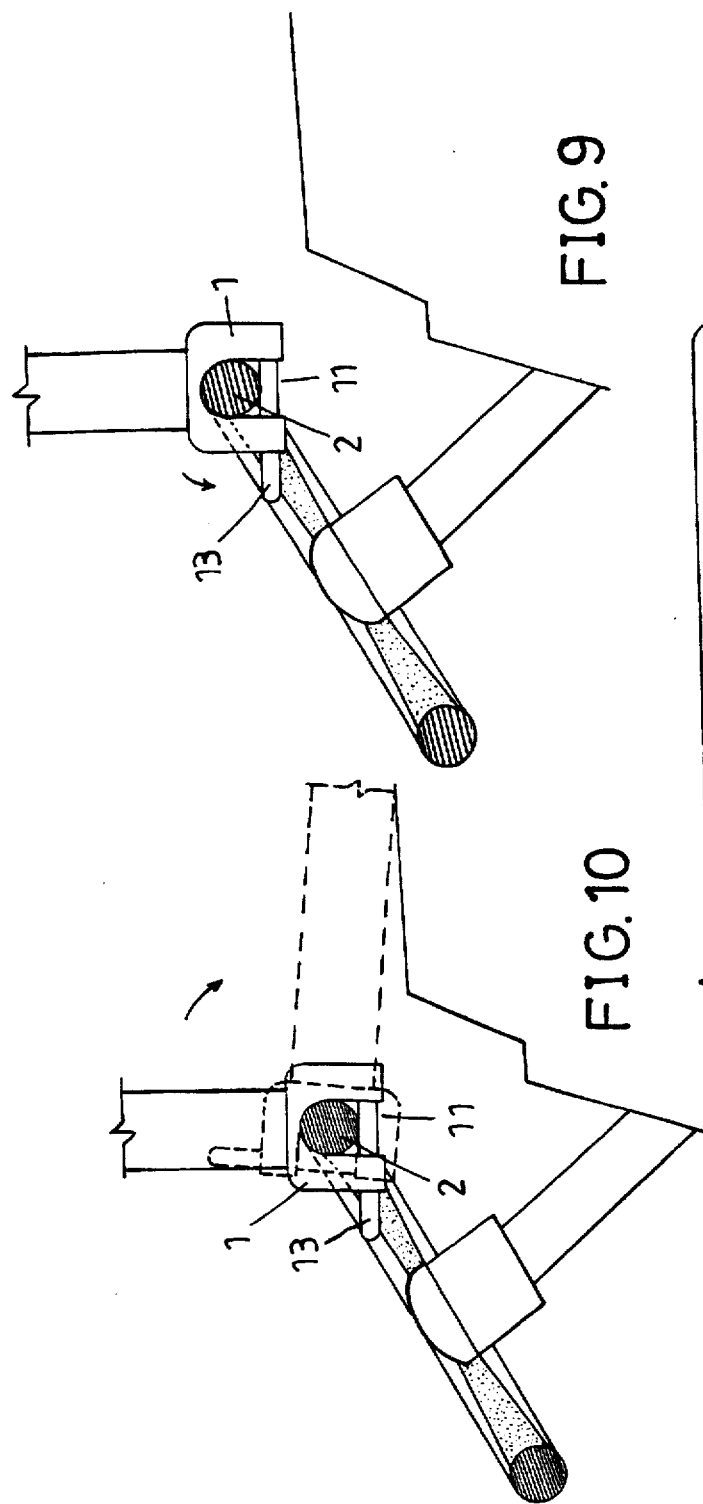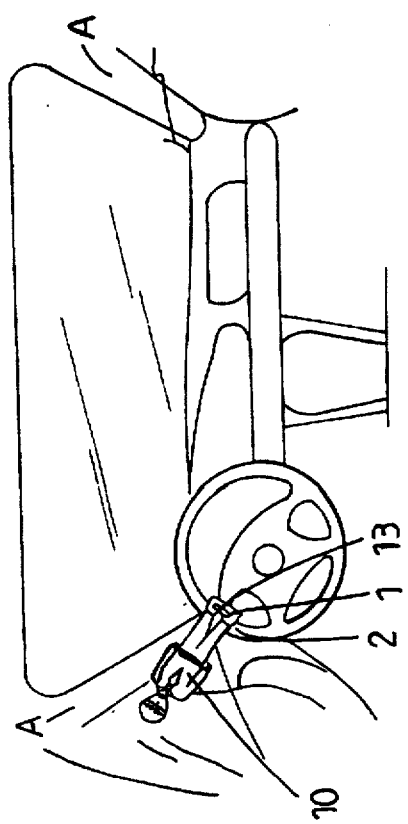

STEERING WHEEL LOCK

BACKGROUND OF THE INVENTION

The present invention relates to steering wheel locks, and more particularly to such a steering wheel lock adapted to be fastened to one three-way frame section of a steering wheel to stop it from turning.

Various steering wheel locks have been disclosed for locking the steering wheel of a motor vehicle, and have appeared on the market. FIGS. 1 and 2 show two prior art steering wheel locks. These steering wheel locks are adapted to be fastened to the periphery of a steering wheel to limit its turning angle. These steering wheel locks are not safe in use because they can be conveniently removed from a steering wheel when the periphery of the steering wheel is cut by a cutting tool. U.S. Pat. No. 4,882,920 discloses another structure of steering wheel lock. This structure of steering wheel lock, as shown in FIG. 3, cannot easily be removed from the steering wheel by cutting off the periphery of the steering wheel. However, this structure of steering wheel lock is inconvenient to install. Because the mouth of the lock body and the extension stop bar of the steering wheel lock are disposed in reversed directions and the extension stop bar must be stopped at the instrument board of the motor vehicle, it is difficult to attach the lock body to the steering wheel in the narrow space near the instrument board.

SUMMARY OF THE INVENTION

The present invention has been accomplished to provide a steering wheel lock which eliminates the aforesaid drawbacks. According to one aspect of the present invention, the lock body of the steering wheel lock is adapted to be fastened to a three-way frame section of the steering wheel. When the steering wheel lock is installed, a thief cannot easily remove the steering wheel lock from the steering wheel by cutting off the periphery of the steering wheel. According to another aspect of the present invention, the steering wheel lock is equipped with an alarm system which produces an audio alarm signal through a speaker when the lock body is damaged by a thief. According to still another aspect of the present invention, a guard with projecting rods is mounted on the lock body of the steering wheel lock to protect the speaker, and to prevent the speaker from being masked.

BRIEF DESCRIPTION OF THE DRAWINGS

FIG. 8 is a schematic drawing showing the steering wheel lock installed and stopped at a window frame inside a motor vehicle;

FIG. 9 is a schematic drawing showing the steering wheel lock fastened to a steering wheel and stopped from forward turning according to the present invention; and FIG. 10 is a schematic drawing showing the steering wheel lock fastened to a steering wheel and turned backwardly downwards according to the present invention.

DETAILED DESCRIPTION OF THE PREFERRED EMBODIMENT

Figures 1, 2, 3:
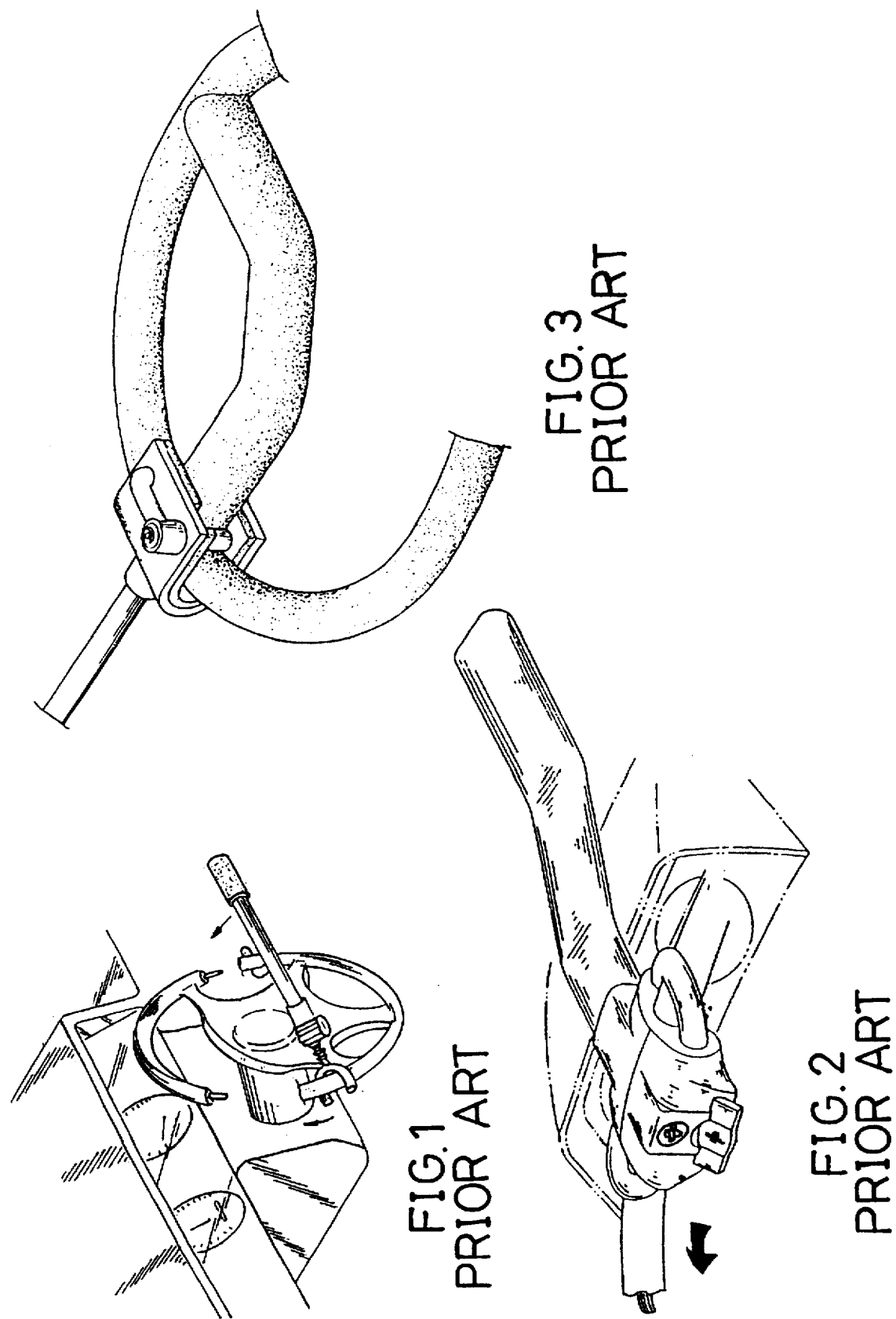
FIG. 1 shows a steering wheel lock installed in a steering wheel according to the prior art.
FIG. 2 shows another structure of steering wheel lock installed in a steering wheel according to the prior art.
FIG. 3 shows still another structure of steering wheel lock installed in a steering wheel according to the prior art.
Figure 4:
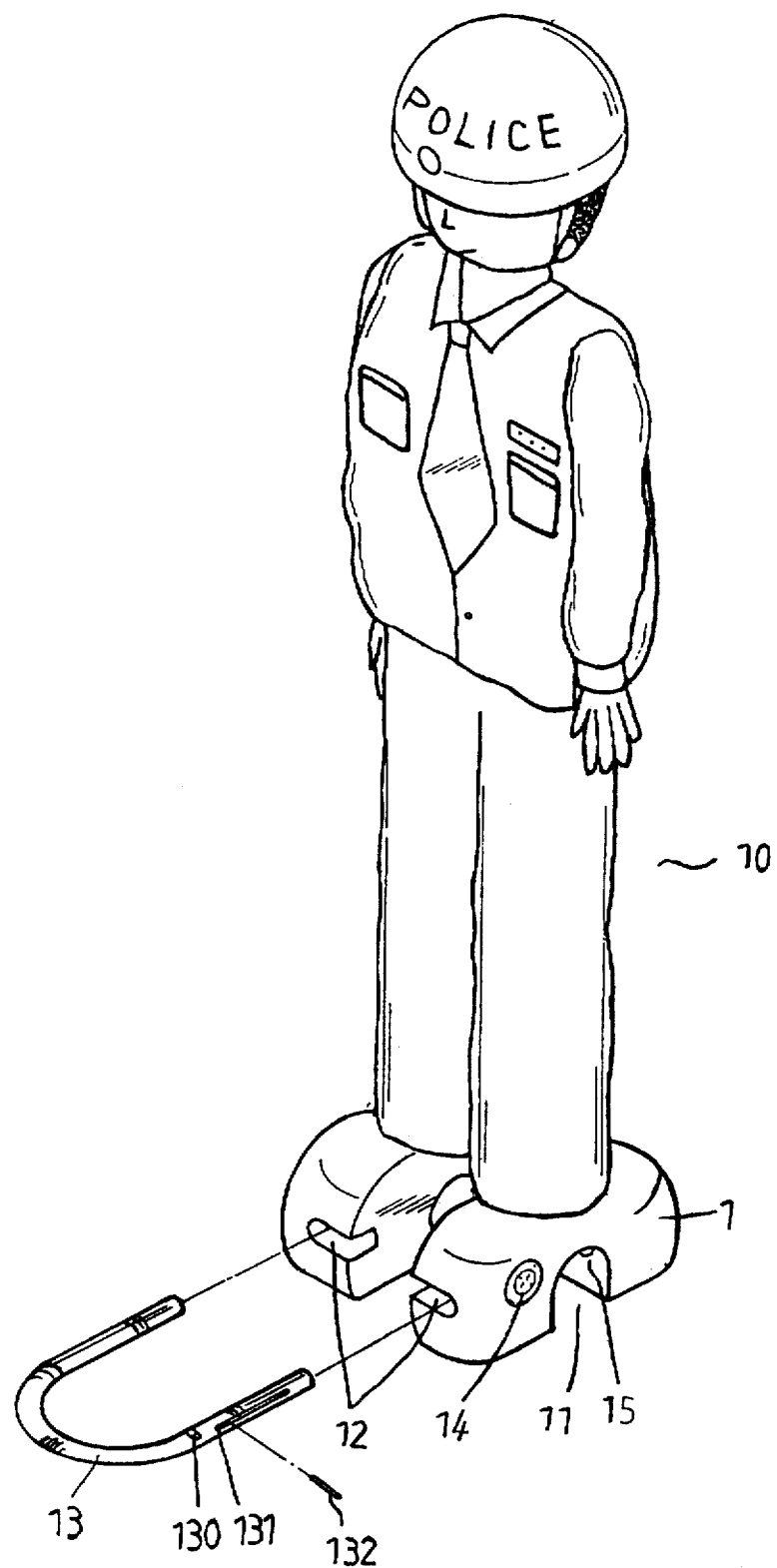
FIG. 4 is an exploded view of a steering wheel lock according to the present invention.
Figure 5:
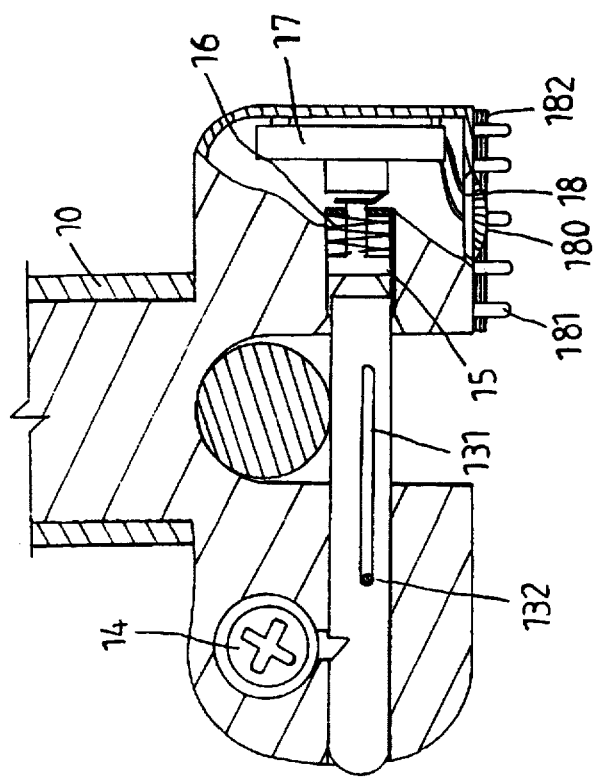
FIG. 5 is a sectional view in an enlarged scale of a part of the present invention, showing the shackle locked in the lock body.
Figure 6:
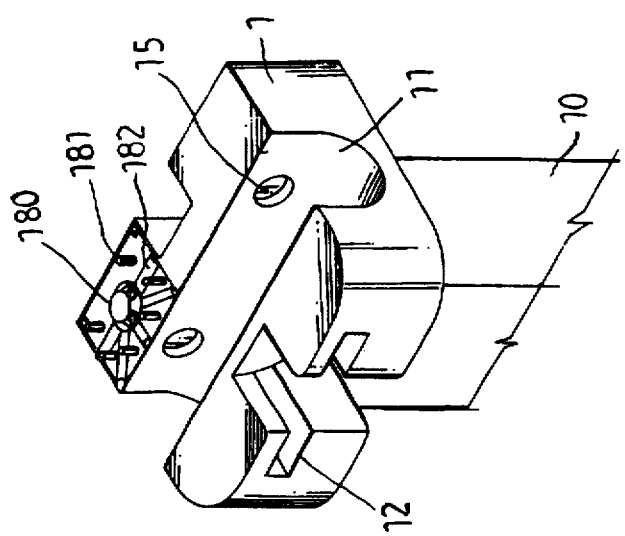
FIG. 6 shows the bottom side structure of the lock body according to the present invention.

Referring to FIGS. 4, 5 and 6, a top member 10 extends upwards from a lock body 1. The top member 10 is made from for example rigid metal, and processed through a heat treatment to reinforce its structural strength. Therefore, it is not easy to cut off the top member 10. The top member 10 can have any of a variety of shapes. For example, the top member 10 shown in FIG. 4 is shaped like a policeman. The lock body 1 comprises a bottom open chamber 11 adapted to receive the periphery of a steering wheel, two shackle holes 12 perpendicularly and forwardly extended from the bottom open chamber 11 to its front side in which inserted is a shackle 13. The shackle 13 has a longitudinal sliding groove 131, and a lock hole 130. When the two opposite ends of the shackle 13 are inserted into the shackle holes 12, a locating pin 132 is installed in the lock body 1 and perpendicularly inserted into the sliding groove 131 to hold the shackle 13 in place, permitting the shackle 13 to be moved in and out of the shackle holes 12 of the lock body 1. A lock cylinder 14 is mounted in the lock body 1, and adapted to lock the shackle 13 (lock hole 130 of the shackle 13). An alarm 17 is installed in the lock body 1 near its back side. An actuating element 15 is supported on a spring 16 inside the lock body 1 in front of the alarm 17. When the shackle 13 is locked, the actuating element 15 is pressed against the alarm 17, and the alarm is disalarmed. A speaker 18 is mounted on the lock body 1 at its bottom side, and electrically connected to the alarm 17. When the shackle 13 is forced out of place by a thief, the actuating element 15 is released, and the alarm 17 is triggered to produce an audio alarm signal through the speaker 18. A guard 180 is covered over the speaker 18 for protection. The guard 180 has projecting rods 181 and radial ribs 182 that prohibit the insertion of fingers through the guard 180.

Figure 7:
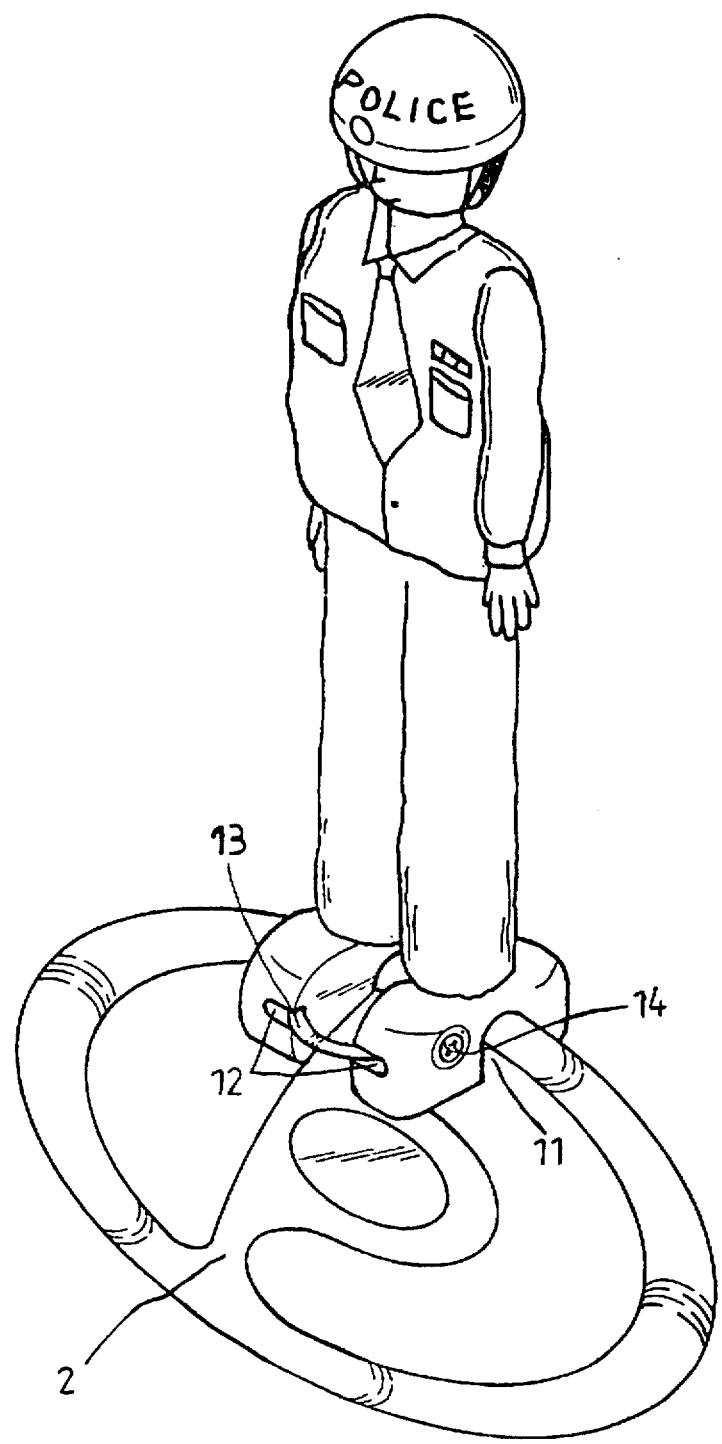
FIG. 7 is an applied view of the present invention, showing the steering wheel lock fastened to one three-way frame section of a steering wheel.

Referring to FIGS. 7 and 8, the bottom open chamber 11 is attached to one three-way frame section of a steering wheel 2, and then the shackle 13 is inserted into the shackle holes 12 and locked by the lock cylinder 14. Because the lock is fastened to one three-way frame section of the steering wheel 2, it still cannot be removed from the steering wheel 2 if the thief uses a cutting tool to cut off the periphery of the steering wheel 2. The extension stop bar which extends from the lock body 1 is stopped at the vehicle window or window frame A to limit the turning angle of the steering wheel 2 (see FIG. 8).

Referring to FIGS. 9 and 10, because the shackle 13 is stopped at a part of the three-way frame section of the steering wheel 2, the thief cannot turn the top bar 10 forwardly downwards (see FIG. 8). If the thief turns the top bar 10 backwardly downwards, it will be stopped at the instrument board of the vehicle, causing the steering wheel to be unable to be turned (see FIG. 10).

I claim:

1. A steering wheel lock comprising:

a lock body equipped with a lock cylinder, having a bottom open chamber adapted to receive one three-way frame section of a steering wheel of a motor vehicle and two shackle holes perpendicularly and forwardly extended from said bottom open chamber;

a shackle having two opposite ends respectively inserted into the shackle holes of said lock body and locked by said lock body to secure said lock body to said steering wheel;

a speaker mounted in said lock body and protected by a guard on said lock body;

an alarm mounted in said lock body and controlled to produce an audio alarm signal through said speaker; and an actuating element supported on a spring in front of said alarm and adapted to control the operation of said alarm, said actuating element being depressed to disarm said alarm when said shackle is locked, or released to trigger said alarm when said shackle is forced out of the locking position.

* * * * *